G. W. BALDING.
Feed Rack.
No. 69,608.
Patented Oct. 8, 1867.
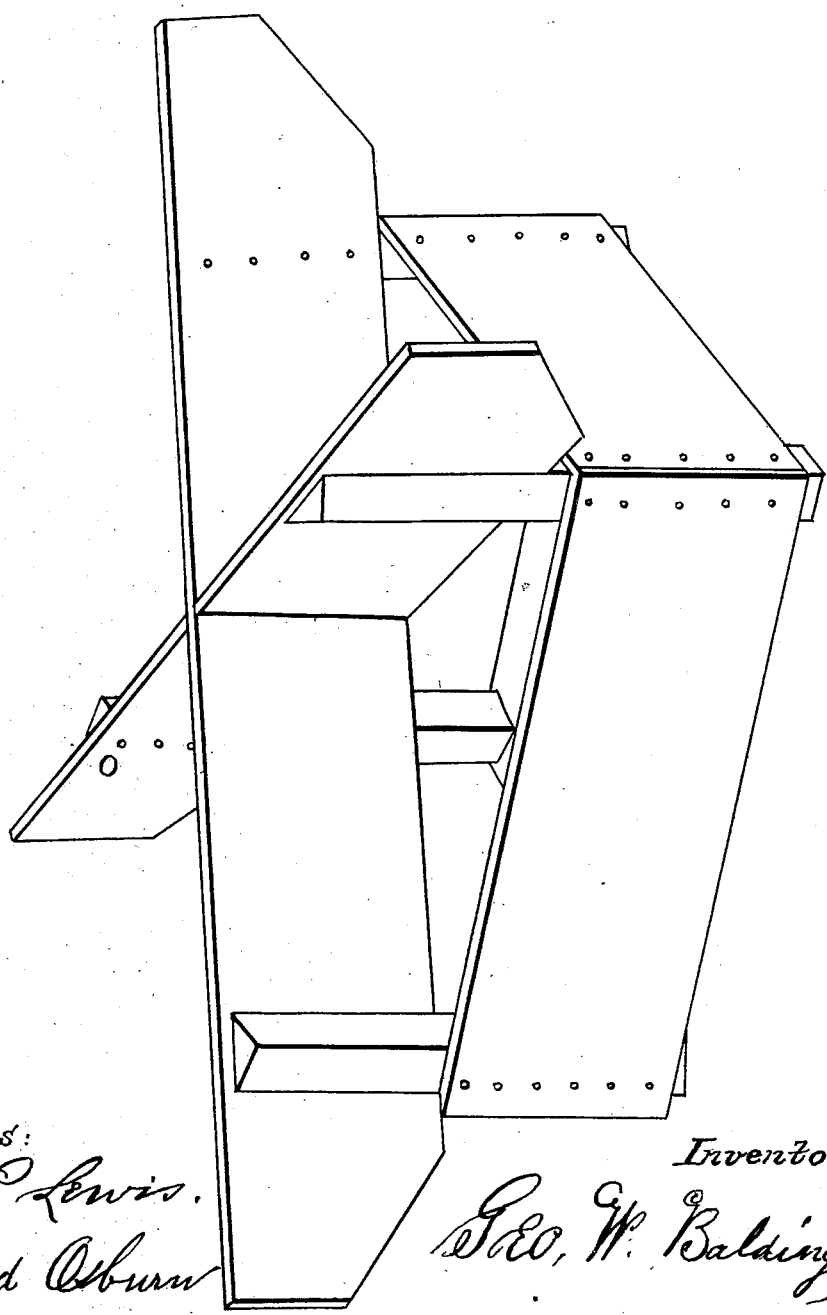

United States Patent Office.

GEORGE W. BALDING, OF ANGOLA, INDIANA.

Letters Patent No. 69,608, dated October 8, 1867.

---

IMPROVEMENT IN FEEDING-RACK FOR CATTLE.

---

The Schedule referred to in these Letters Patent and making part of the same.

---

TO ALL WHOM IT MAY CONCERN:

Be it known that I, GEORGE W. BALDING, of Angola, in the county of Steuben, in the State of Indiana, have invented a new and improved Mode of Feeding Cattle in a Box; and I do hereby declare that the following is a full, clear, and exact description of the construction thereof, reference being had to the accompanying drawings, making a part of this specification.

I construct said feed-box of boards and posts, nailed or bolted together, though I do not confine it to any particular size. I think the following the most proper size. The boards for the lower part of the box should be five feet long, nailed to upright posts in the corners. The posts, each four feet high, boarded from or near the lower ends of the posts half way to the tops of the posts, that is, two feet high, making a box without bottom, of sides only, with the posts in the corners extending two feet above the sides of the box. Then I take boards ten feet long, crossing them centrally by notching and interlocking them together edgewise perpendicularly, and placing these cross-boards lengthwise diagonally, or nearly so, from post to post over and above the side boards aforesaid, nailing or bolting them to the said posts in the corners, so that these cross-boards will project beyond the sides of the same, forming guards outside of the box at each corner, to protect the cattle from being hooked, as shown in the accompanying drawing.

First. The usefulness of this invention consists in a cheap, strong box, for the diagonal interlocked boards brace it firmly, while it is light and portable.

Second. Its convenience in feeding. It can be filled from either side, without the labor of dividing the hay for four cattle, and the consequent waste.

Third. The cross-boards keep the hay or other food from being blown or thrown out, and protect the cattle from being hooked.

Fourth. The ends of the cross-boards so project at the corners outside of the box that they prevent manure droppings being made near or against the same, and protect against being hooked by turning the pursuer so that the pursued has time to get out of his way, for after the pursuer's head is in sight of his pursued the projecting end of the cross-board takes him in the neck, shoulder, and side at such an angle that he must take time to swing around.

The lower part of the box, (that is the square part) I do not claim the invention of as new of itself. What I claim as my invention, and desire to secure by Letters Patent, is—

The notched interlocking boards crossing the box diagonally, and projecting beyond the sides of the same, and secured to the upright posts in the corners of the box, in combination with said box, all constructed and arranged as described and shown, for the purpose specified.

GEORGE W. BALDING.

Witnesses:
  ALFRED OSBURN,
  NEWEL LEWIS.